United States Patent [19]

Akasaka et al.

[11] Patent Number: 5,082,347

[45] Date of Patent: Jan. 21, 1992

[54] TAPE-LIKE COATED OPTICAL FIBER

[75] Inventors: Nobuhiro Akasaka; Toshiaki Zakoh; Toru Yamanishi; Wataru Katsurashima; Ichiro Ogasawara, all of Kanagawa, Japan

[73] Assignee: Sumitomo Electric Industries, Ltd., Osaka, Japan

[21] Appl. No.: 582,099

[22] Filed: Sep. 14, 1990

[30] Foreign Application Priority Data

Sep. 22, 1989 [JP] Japan .................................. 1-247743

[51] Int. Cl.[5] .............................................. G02B 6/44
[52] U.S. Cl. ........................................ 385/114; 385/128
[58] Field of Search ........................... 350/96.23, 96.34

[56] References Cited

U.S. PATENT DOCUMENTS

| | | | |
|---|---|---|---|
| 4,844,604 | 7/1989 | Bishop et al. | 350/96.34 X |
| 4,900,126 | 2/1990 | Jackson et al. | 350/96.23 |
| 4,906,067 | 3/1990 | Mayr et al. | 350/96.23 |
| 4,930,860 | 6/1990 | Tansey et al. | 350/96.23 |
| 4,953,945 | 9/1990 | Nishimura et al. | 350/96.23 |

*Primary Examiner*—John D. Lee
*Attorney, Agent, or Firm*—Cushman, Darby & Cushman

[57] ABSTRACT

A tape-like coated optical fiber comprises: a plurality of optical fiber strands arranged side by side on a plane; and a tape coating of ultraviolet curable resin applied onto an outer periphery of the plurality of optical fiber strands so as to integrate the plurality of optical fiber strands with each other; each of the plurality of optical fiber strands having an optical fiber glass, a coating layer of ultraviolet curable resin provided on an outer periphery of the optical fiber glass, and a colored layer provided on the coating layer of ultraviolet curable resin. The weight of a volatile component contained in a coloring material used in the colored layer at 60° C. is not larger than 5% of weight of the coloring material.

1 Claim, 1 Drawing Sheet

TAPE-LIKE COATED OPTICAL FIBER

BACKGROUND OF THE INVENTION

The present invention relates to a tape-like coated optical fiber in which a plurality of optical fiber strands colored for discrimination are arranged side by side on a plane and a tape coating is applied onto the outer periphery of the side-by-side arrangement of the optical fiber strands so as to integrate the optical fiber strands with each other.

Generally, a tape-like coated optical fiber has such a configuration that a plurality of optical fiber strands each having one or more of protection layers of ultraviolet curable resin provided on an outer periphery of an optical fiber glass are arranged side by side on a plane and a tape coating of ultraviolet curable resin is applied onto an outer periphery of the optical fiber strands so as to integrate the optical fiber strands with each other.

In such a tape-like coated optical fiber, it is necessary that the tape-like coated optical fiber is separated into optical fiber strands and the thus separated optical fibers are discriminated from each other in measurement of optical fiber transmission characteristics, attachment of a connector for conversion from a multi-core coated optical fiber into single-core coated optical fibers, or the like. There has been proposed a tape-like coated optical fiber, as disclosed, for example, in Japanese Patent Unexamined Publication No. Sho-63-281109, in which a layer colored with ultraviolet curable ink is provided on a coating layer of ultraviolet curable resin of each of the optical fiber strands and a peeling-off property is given to the colored layer.

FIG. 1 is a cross section of such a tape-like coated optical fiber. In the drawing, reference numeral 1 designates an optical fiber glass; 2, a coating layer of ultraviolet curable resin; 3, a layer colored with ultraviolet curable ink; and 4, a tape coating of ultraviolet curable resin.

In the foregoing tape-like coated optical fiber shown in FIG. 1, in view of separation of the coated optical fiber into single-core optical fibers and discrimination of the separated optical fiber strands, endeavor has been made so as to reduce adhesion between the optical fiber strands and the tape coating by providing the colored layer on the ultraviolet curable resin coating layer of each of the optical fiber strands.

If such a tape-like coated optical fiber is exposed to high temperature and humidity, however, there have been problems in that since a non-cured component and a residual initiator evaporate from each of constituent materials as volatile components and a tape material exists in the upper layer, vapor permeated through the tape coating adheres to the partially remaining initiator and sensitizer to partially form dew to cause partial peeling-off between the tape coating and the optical fiber strands which are weak in adhesion so that not only abnormality is caused in the exterior but bending is locally generated in the optical fiber to thereby deteriorate the transmission characteristics.

SUMMARY OF THE INVENTION

An object of the present invention is therefore to provide a tape-like coated optical fiber in which the foregoing problems are solved. The present invention has a feature in that in a tape-like coated optical fiber, the weight of a volatile component contained in a coloring material used in the colored layer at 60° C. is not larger than 5% of weight of the coloring material.

As described in the Background of the Invention section, in the case where, in view of separation into single-core optical fibers and discrimination of the separated optical fiber strands, the colored layer is intentionally provided on the ultraviolet curable resin coating of each of the optical fiber strands and adhesion of the individual optical fiber strands to the tape coating is reduced, and in the case of use of ink having, for example, an ultraviolet curable property, the quantities of the initiator and sensitizer are increased so as to increase the degree of curing, so that volatile components of the initiator, the sensitizer, and the like remain after curing. Also in the case of using solvent type ink, the solvent remains. Therefore, under the conditions of high temperature and high humidity, a large quantity of volatile components evaporate from the ink layer and vapor permeated through the tape coating forms dew by the foregoing reason between the colored layer and the tape coating to thereby partially cause separation.

The inventors of this application has performed various investigations as to the volatile components from the colored layers which cause the foregoing separation, and has found that the partial peeling off between the optical fiber strands and the tape coating can be prevented if the quantity of the volatile component in the coloring material is selected to be not larger than 5 wt. % at 60° C. which is the maximum use temperature.

DETAILED DESCRIPTION OF THE PREFERRED EMBODIMENTS

Figure 1:
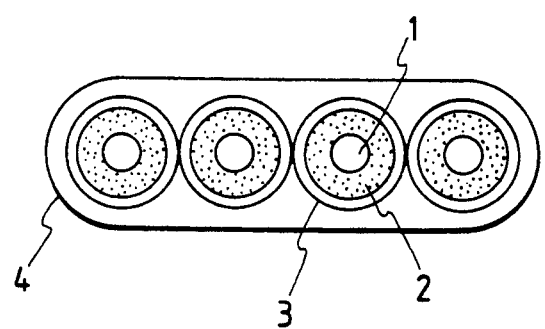
FIG. 1 is a cross section showing an example of a tapelike coated optical fiber.

A preferred embodiment will be described.

Each of single-mode optical fibers having an optical fiber glass core of 125 $\mu m\phi$ was coated with two layers of two kinds of ultraviolet curable resin (hereinafter, simply referred to as "UV resin") to thereby prepare UV resin coated optical fiber strands (hereinafter, simply referred to as "UV strands"). Ultraviolet curable ink containing volatile components by 10 wt. %, 7 wt. %, and 4.5 wt. % at 60° C. were applied onto the prepared UV strands to thereby obtain colored UV strands each having a diameter of 250 $\mu m\phi$, where the weight percentages of the volatile components were measured after the ultraviolet curable ink was cured and heated up to 60° C. The colored UV strands were arranged side by side, and integrated with each other by using UV resin so as to prepare three kinds of tape-like coated optical fibers. The three kinds of tape-like coated optical fibers were left as they were in an atmosphere of 60° C. and 95 %RH for a month, and the transmission characteristics and exterior of the tape-like coated optical fibers were inspected. Table 1 shows the measurement results.

TABLE 1

|  | comparative example | | Invention |
| --- | --- | --- | --- |
|  | 10% tape coated optical fiber | 7% tape coated optical fiber | 4.5% tape coated optical fiber |
| transmission loss at 1.55 μm | 0.46 dB/Km | 0.33 dB/Km | 0.21 dB/Km |
| exterior of tape coated optical fiber | partial peeling off | partial peeling off | no peeling off |

As described above, in the tape-like coated optical fiber according to the present invention, the contents of the volatile component in the coloring material (ink) used in the colored layer is selected to be not larger than 5 wt. % at 60° C. which is the maximum use temperature to thereby make it possible to prevent peeling off between the optical fiber strands and the tape coating, which is the weakest point in the structure of the tape-like coated optical fiber, and to prevent reduction of the transmission characteristics due to the peeling off.

What is claimed is:

1. A tape-like coated optical fiber, comprising:

a plurality of optical fiber strands arranged side by side on a plane, each of said plurality of optical fiber strands having an optical fiber glass, a coating layer of ultraviolet curable resin on an outer periphery of said optical fiber glass, and a colored layer on said coating layer of ultraviolet curable resin, the colored layer including coloring material having volatile material no more than 5% in weight of said coloring material at 60° C.; and a tape coating of ultraviolet curable resin applied onto an outer periphery of said plurality of optical fiber strands so as to integrate said plurality of optical fiber strands with each other.

* * * * *